(12) United States Patent
Tong

(10) Patent No.: US 10,815,153 B2
(45) Date of Patent: Oct. 27, 2020

(54) APPARATUS AND METHOD FOR PRODUCING CEMENT THROUGH FLUE GAS DESULFURIZATION

(71) Applicant: Shanghui Tong, Daxing District, Beijing (CN)

(72) Inventor: Shanghui Tong, Beijing (CN)

( * ) Notice: Subject to any disclaimer, the term of this patent is extended or adjusted under 35 U.S.C. 154(b) by 536 days.

(21) Appl. No.: 15/375,679

(22) Filed: Dec. 12, 2016

(65) Prior Publication Data

US 2017/0088467 A1    Mar. 30, 2017

Related U.S. Application Data

(63) Continuation of application No. PCT/CN2015/092539, filed on Oct. 22, 2015.

(30) Foreign Application Priority Data

Dec. 3, 2014   (CN) .................. 2014 1 07240133

(51) Int. Cl.
| | |
|---|---|
| *C04B 2/10* | (2006.01) |
| *C04B 28/30* | (2006.01) |
| *B01D 53/80* | (2006.01) |
| *C04B 9/04* | (2006.01) |
| *C04B 28/34* | (2006.01) |
| *C04B 28/32* | (2006.01) |
| *B01D 53/50* | (2006.01) |

(Continued)

(52) U.S. Cl.
CPC .............. *C04B 28/30* (2013.01); *B01D 53/50* (2013.01); *B01D 53/502* (2013.01); *B01D 53/73* (2013.01);
(Continued)

(58) Field of Classification Search
USPC .................................. 106/638, 739, 713
See application file for complete search history.

(56) References Cited

U.S. PATENT DOCUMENTS

| | | | |
|---|---|---|---|
| 2009/0114126 A1* | 5/2009 | Roddy | C04B 28/02 106/692 |
| 2011/0214591 A1* | 9/2011 | Ibaraki | C04B 28/145 106/715 |

FOREIGN PATENT DOCUMENTS

| | | |
|---|---|---|
| CN | 2058677 U | 6/1990 |
| CN | 2721212 Y | 8/2005 |

(Continued)

OTHER PUBLICATIONS

First Office Action issued in corresponding Chinese Application No. 201410724013.3.

(Continued)

*Primary Examiner* — James E McDonough
(74) *Attorney, Agent, or Firm* — Nath, Goldberg & Meyer; Joshua B. Goldberg; Tanya E. Harkins

(57) ABSTRACT

The present invention provides an apparatus and a method for producing cement through flue gas desulfurization, and specifically provides an apparatus and a method for simultaneously producing magnesium sulfate cement during a magnesium oxide based flue gas desulfurization process. The apparatus of the present invention includes a flue gas desulfurization equipment, a concentration equipment, a crystallization equipment, a centrifugation equipment, a drying equipment, a waste ash supplying equipment, a slag material supplying equipment, a mixing equipment, etc. By adopting the apparatus and method of the present invention, the problems in the present conventional cement production such as high energy cost, severe damage to the environment and so on can be solved, and the problems like high production cost of ordinary magnesium sulfate cement and high transportation cost of supplies thereby causing incapability in a large scale market spreading and application can also be solved.

4 Claims, 1 Drawing Sheet

(51) Int. Cl.
  *B01D 53/73* (2006.01)
  *C04B 7/34* (2006.01)
  *C04B 7/00* (2006.01)
  *C04B 28/00* (2006.01)
  *C04B 32/00* (2006.01)
  *C04B 9/12* (2006.01)
  *C04B 28/04* (2006.01)

(52) U.S. Cl.
  CPC ................ *B01D 53/80* (2013.01); *C04B 9/04* (2013.01); *C04B 28/32* (2013.01); *C04B 28/34* (2013.01); *B01D 2251/402* (2013.01); *B01D 2257/302* (2013.01); *B01D 2258/0283* (2013.01); *Y02W 30/91* (2015.05)

(56) References Cited

FOREIGN PATENT DOCUMENTS

| CN | 1762550 | A |   | 4/2006 |
|----|---------|---|---|--------|
| CN | 102344277 | A | * | 2/2012 |
| CN | 102344277 | A |   | 2/2012 |
| CN | 103446871 | A |   | 12/2013 |
| CN | 103585877 | A | * | 2/2014 |
| CN | 103585877 | A |   | 2/2014 |
| CN | 104446064 | A |   | 3/2015 |
| CN | 104529205 | A |   | 4/2015 |

OTHER PUBLICATIONS

Second Office Action issued in corresponding Chinese Application No. 201410724013.3.

Third Office Action issued in corresponding Chinese Application No. 201410724013.3.

International Search Report issued in corresponding International Application No. PCT/CN2015/092539.

English translation of the Written Opinion of the International Searching Authority issued in corresponding International No. PCT/CN2015/092539.

* cited by examiner

APPARATUS AND METHOD FOR PRODUCING CEMENT THROUGH FLUE GAS DESULFURIZATION

CROSS-REFERENCE TO RELATED APPLICATIONS

The present application is a continuation of International Patent Application No. PCT/2015/092539, filed on Oct. 22, 2015, which claims priority to Chinese Patent Application No. 201410724013.3, filed on Dec. 3, 2014, the contents of both of which are incorporated herein by reference in their entireties.

TECHNICAL FIELD

The present invention relates to an apparatus and a method for producing cement through flue gas desulfurization and, particularly relates to an apparatus and a method for producing cement through magnesium oxide based flue gas desulfurization, specifically relates to an apparatus and a method for simultaneously producing magnesium sulfate cement during the magnesium oxide based flue gas desulfurization process. The apparatus and method of the present invention belongs to apparatuses and processes that are green, energy saving and environment friendly, and are particularly suitable for the fields like coal fired boiler, sintering machine, pellet and rotary furnace flue gas that need flue gas desulfurization.

BACKGROUND

At present, the total output of China cement industry is more than 3 billion tons per year, accounting for about half of the world's total production capacity. The cement industry, as a conventional industry, has a phenomenon of two "high" and one "damage": high energy consumption, high emission of carbon dioxide and other pollutants, serious damage to the ecological environment.

The producing process of cement has various process links (e.g. mining of raw materials, raw material preparation, clinker calcination and cement grinding) that need conveying equipment, crushing equipment, grinding equipment, calcination equipment, motors, fans and the like, all of which need great electric power consumption. Every ton of cement produced needs to consume approximately 110 kW·h of electric power. The clinker calcination of cement contains a series of physical and chemical processes (e.g. raw mineral decomposition, solid phase reaction, liquid phase sintering and clinker cooling), which all need to consume a large amount of thermal energy. A frequently used calcination process at present is the pre-decomposition furnace process, in which the coal injection pipe respectively delivers the fire coal into the decomposition furnace and the rotary furnace for burning. The theoretical heat consumption of the cement clinker forming reaction is 1700 kJ/kg. Due to heat radiation of the surface of the furnace cylinder and heat entrainment of the burning flue gas and the furnace clinker, the actual heat consumption of the cement clinker forming reaction is approximately 3200 kJ/kg, that is, the comprehensive coal consumption for each ton of cement clinker is approximately 110 kg of standard coal.

The cement producing process directly produces carbon dioxide, the carbon dioxide emission factor of the fire coal is between 2.31-2.55 kg of carbon dioxide per kg of standard coal, while the emission factor recommended by the Energy Office of the National Development and Reform Commission is 2.46 kg of carbon dioxide per kg of standard coal. Thus, the direct carbon dioxide emission from combustion of the fire coal needed for producing each ton of cement clinker is approximately 295 kg. Cement production adopts calcareous raw materials, and carbonate minerals in calcined calcareous raw materials will be decomposed, releasing a large amount of carbon dioxide. Usually, each ton of cement clinker needs to consume 1.55 ton of raw materials, which produces 550 kg of direct carbon dioxide emission. Based on that the clinker ratio in the cement is 0.75, it can be accounted that the total carbon dioxide emission for producing each ton of cement is approximately 728 kg. With an annual output of 3 billion tons of cement, the annual carbon dioxide emission is nearly 2.184 billion tons. At present, China's total annual carbon dioxide emission is approximately 5.7 billion tons, accordingly, carbon dioxide emission of the traditional cement industry accounts for more than 38%.

China's traditional calcium based desulphurization technologies include a process technology that adopts desulfurized gypsum generated from the calcium based desulphurization to produce cement, in which the traditional gypsum is completely replaced by the desulfurized gypsum. Each ton of cement saves the cost for approximately 5~8 yuan on raw material. However, the manner for producing cement with the desulfurized gypsum instead of traditional gypsum has merely solved the problem of the gypsum source, the whole production process has always maintained the original process, with almost the same energy consumption, resource consumption and the like as those of the original process.

Chinese patent application No. 95193375.2 provides an improved manner for preparing foamed magnesia cement, by mixing magnesium oxide, magnesium chloride and/or magnesium sulfate, water and organic carboxylic acid that can make the cement foam, and/or anhydrides and/or salts thereof. This manner does not need the firing process, however, materials like magnesium chloride, magnesium sulfate and others needed in the production process need outsourcing, with the outsourcing cost and transportation cost included, the production cost for each ton of cement is nearly two times of ordinary model 3.25 cement or model 4.25 cement. Although the performance of the foamed magnesia cement is better than the ordinary cement, the production cost is too high, resulting in high selling price, which limits its spreading and application in China.

Chinese patent application with publication No. CN103265263A discloses a manner for preparing magnesium oxysulfate cement, which mainly adopts waste sulfuric acid, magnesium oxide, pulverized fuel ash, phosphoric acid or dihydrogen phosphate salt in a certain ratio, adds them into a blender and mixes evenly to form the magnesium oxysulfate cement. This manner produces magnesium sulfate through the reaction of waste sulfuric acid and magnesium oxide, thus magnesium sulfate does not need outsourcing, however, the production cost is still high.

In summary, the cement production cost of both the above two manners is quite high, which limits their market spreading and application speed, moreover, the production of magnesium sulfate, magnesium chloride and the like still needs large consumption of natural resources and energy, and the production process will also discharge lots of pollutants such as waste water, sulfur dioxide and so on.

SUMMARY

In order to overcome the defects of the prior art, the present invention provides an apparatus and a method for producing cement through flue gas desulfurization and, particularly provides an apparatus and a method for producing cement through magnesium oxide based flue gas desulfurization, specifically, provides a system and a method for simultaneously producing magnesium sulfate cement during the magnesium oxide based flue gas desulfurization process. By adopting the apparatus and method of the present invention, the problems in the present conventional cement production such as high energy cost, severe damage to the environment and so on can be solved, and the problems like high production cost of ordinary magnesium sulfate cement and high transportation cost of supplies resulting in incapability in a large scale market spreading and application can also be solved.

The preferred apparatus and method of the present invention can solve problems that have long term troubled coal fired power generation enterprises and steel and iron metallurgy enterprises that adopt magnesium based desulfurization technologies, e.g. poor quality of the magnesium sulfate product, low price and less economic benefit resulted thereof, and treatment difficulties of waste ash and waste slags (steel slag, iron slag, mineral waste residue).

The present invention provides an apparatus for producing cement though flue gas desulfurization, including:

a flue gas desulfurization equipment, configured to remove sulfur dioxide from a flue gas in a magnesium oxide based manner, and form an absorption product containing magnesium sulfate;

a concentration equipment, configured to concentrate the absorption product containing magnesium sulfate from the flue gas desulfurization equipment to form a concentration product;

a crystallization equipment, configured to receive the concentration product formed in the concentration equipment, and generate crystal particles in the concentration product, so as to acquire a concentration product containing magnesium sulfate crystals;

a centrifugation equipment, configured to centrifugally separate the concentration product containing the magnesium sulfate crystals from the crystallization equipment to form a precipitate containing the magnesium sulfate crystals;

a drying equipment, configured to dry the precipitate containing the magnesium sulfate crystals from the centrifugation equipment to form a dried precipitate;

a waste ash supplying equipment, configured to provide waste ash;

a slag material supplying equipment, configured to provide a slag material used for cement;

an additive supplying equipment, configured to provide an additive used for cement;

a mixing equipment, configured to mix the dried precipitate from the drying equipment, the waste ash from the waste ash supplying equipment, the slag material used for cement from the slag material supplying equipment and the additive used for cement from the additive supplying equipment to form cement.

According to the apparatus for producing cement through flue gas desulfurization, preferably, an upper portion of an interior of the flue gas desulfurization equipment is provided with a sulfur dioxide absorbing and spraying region, configured to remove sulfur dioxide in the flue gas in a magnesium oxide based manner, and form the absorption product containing magnesium sulfate.

According to the apparatus for producing cement through flue gas desulfurization, preferably, the concentration equipment is:

1) a cycling and precipitating tank provided inside the flue gas desulfurization equipment, and the cycling and precipitating tank is arranged at a lower portion of the flue gas desulfurization equipment; or 2) an evaporation and concentration equipment provided outside the flue gas desulfurization equipment.

The concentration and concentration equipment of the present invention is preferably a one-effect, two-effect or three-effect evaporation and concentration equipment.

According to the apparatus for producing cement through flue gas desulfurization of the present invention, preferably, the apparatus further includes a slag material grinding equipment, configured to grind the slag material used for cement into a powder, and transport the powder to the slag material supplying equipment.

According to the apparatus for producing cement through flue gas desulfurization, preferably, the flue gas satisfies one of following conditions:

1) the flue gas is a flue gas that comes from a coal fired boiler, a sintering machine, a pellet or a furnace;

2) a content of sulfur dioxide in the flue gas is 300 mg/Nm$^3$~40000 mg/Nm$^3$, and a content of oxygen is 3~18 vt %.

The present invention further provides a method for producing cement with the apparatus for producing cement through flue gas desulfurization, including steps of:

1) a flue gas desulfurization step: removing sulfur dioxide from a flue gas in a magnesium oxide based manner in a flue gas desulfurization equipment, and forming an absorption product containing magnesium sulfate;

2) a concentration step: concentrating the absorption product containing magnesium sulfate from the flue gas desulfurization equipment in a concentration equipment, so as to form a concentration product;

3) a crystallization step: receiving, by a crystallization equipment, the concentration product formed in the concentration equipment, and generating crystal particles in the concentration product, so as to acquire a concentration product containing magnesium sulfate crystals;

4) a centrifugation step: separating centrifugally the concentration product containing the magnesium sulfate crystals from the crystallization equipment in a centrifugation equipment, so as to form a precipitate containing the magnesium sulfate crystals;

5) a drying step: drying the precipitate containing the magnesium sulfate crystals from the centrifugation equipment in a drying equipment, so as to form a dried precipitate;

6) a mixing step: mixing the dried precipitate from the drying equipment, magnesium oxide from a magnesium oxide supplying equipment, waste ash from a waste ash supplying equipment, slag material from a slag material supplying equipment and an additive from an additive supplying equipment in a mixing equipment, so as to form cement.

According to the method of the present invention, preferably, a granularity of the crystal particles in step 3) is larger than 0.2 mm.

According to the method of the present invention, preferably, a water content of the dried precipitate in step 5) is less than 1%.

According to the method of the present invention, preferably, a content of an active ingredient of the magnesium oxide is 55~95%, preferably 75%.

According to the method of the present invention, preferably, the slag material of step 6) is one or more selected from a group consisting of furnace slag, mineral waste residue, steel slag, iron slag and pulverized fuel ash; and/or the additive of step 7) is one or more selected from a group consisting of silicone rubber, polyester fiber, glass fiber, phosphate acid, dihydrogen phosphate salt, hydrogen phosphate salt, tartaric acid, tartrate, magnesium oxide or Nitrilotri(methylphosphonic acid).

According to the method of the present invention, preferably, the cement is magnesium sulfate cement.

The apparatus and method of the present invention perfectly combine the magnesium oxide based flue gas desulfurization process and the magnesium sulfate cement production process, such that they are simultaneously conducted. The apparatus and method of the present invention cancels links of homogenization, firing, preheating and decomposition in the conventional cement production process. By adopting the preferred apparatus and method of the present invention, the waste liquid disposal problem caused by the magnesium oxide based desulfurization is solved. By adopting the preferred apparatus and method of the present invention, the problem that the amount of the gypsum produced from the calcium based desulfurization is too large to dispose is solved. By adopting the preferred apparatus and method of the present invention, the problem that the ordinary magnesium sulfate cement production process needs a large amount of outsourcing waste acid or finished magnesium sulfate is also solved. The apparatus and method of the present invention can guarantee regular flue gas desulfurization for enterprises and allow circular re-utilization of the slags, ashes and other wastes produced in the industry enterprises as well, which saves cement production line invest as well as greatly reduces the operational cost of desulfurization, and guarantees high operating efficiency of the flue gas desulfurization equipment as well as makes varieties of wastes to be recycled and reused, and therefore is a green, energy saving and environment friendly technique.

The magnesium sulfate cement produced by the present invention allows adding of a large amount of industry waste slag, and the main constituent magnesium sulfate is prepared from the liquid waste after the desulfurization, which is a desulfurization by-product and at a low price, thereby greatly reducing the cost of the magnesium sulfate cement, and reducing the environmental pollution problem caused by the conventional cement production and general magnesium sulfate, magnesium oxychloride cement production. The magnesium sulfate cement produced can not only completely replace the magnesium oxychloride cement, but also directly replace the traditional mode 3.25, 4.25, 5.25 and 6.25 cement due to its low cost. There is also good performance in the aspects of improving building quality, lightening building weight, reducing resource waste and energy consumption, enhancing the enthusiasm of enterprises in flue gas treatment and improving the atmospheric environment quality.

Figure 1:
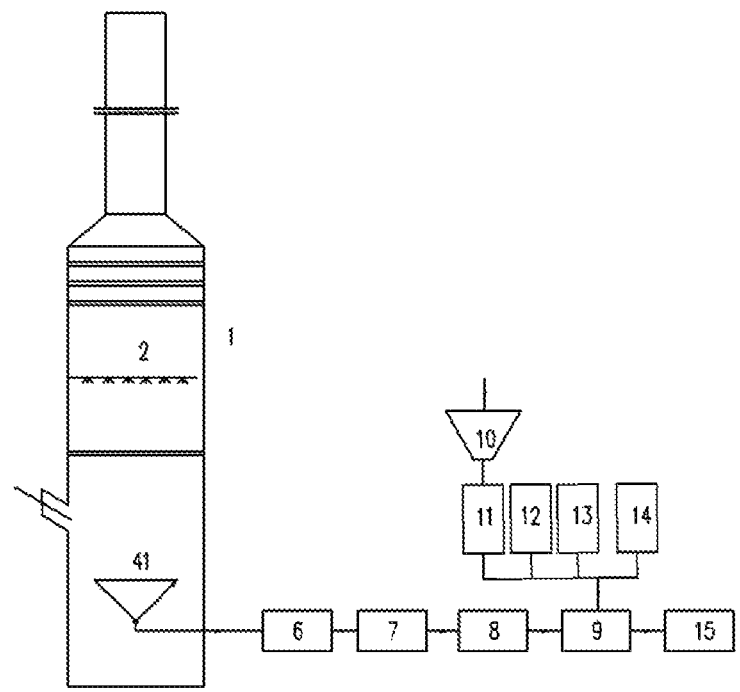
FIG. 1 is a diagram of an apparatus of Embodiment 1 of the present invention.

Reference signs: 1—desulfurization tower, 2—sulfur dioxide absorbing and spraying region, 3—discharging pump, 41—cycling and precipitating tank, 42—three-effect evaporator, 6—crystallizer, 7—centrifuge, 8—dryer, 9—mixer, 10—slag material grinder, 11—slag material feeder, 12—pulverized fuel ash feeder, 13—additive feeder, 14—magnesium oxide feeder, 15—packaging machine.

DESCRIPTION OF EMBODIMENTS

The expressions "%" described in the present invention, unless otherwise specified, all refer to volume percentage. The expressions "vt %" described in the present invention refer to volume percentage.

In the present invention, the magnesium oxide based flue gas desulfurization is a flue gas desulfurization process in which magnesium oxide is the main ingredient of the desulfurization agent, and the addition of other ingredients (e.g. calcium oxide, calcium hydroxide) is not limited. The structure and composition of the desulfurization agent varies according to differences of product categories, product types and quality of the magnesium sulfate cement to be produced later, and the composition or variation is well known for the person in the art.

According to an embodiment of the present invention, the flue gas of the present invention can be a flue gas from a coal fired boiler, a sintering machine, a pellet or a furnace, preferably from the coal fired boiler, the sintering machine or the furnace, further preferably from the coal fired boiler or the sintering machine. The purity of the magnesium sulfate product can be improved, since a certain amount of oxygen and an appropriate content of sulfur dioxide exist in the flue gas. According to another embodiment of the present invention, the content of sulfur dioxide in the flue gas can be 300 mg/Nm$^3$~40000 mg/Nm$^3$, preferably 500 mg/Nm$^3$~30000 mg/Nm$^3$, and further preferably 1000 mg/Nm$^3$~5000 mg/Nm$^3$. The content of oxygen in the flue gas of the present invention can be 3~18 vt %, preferably 9~18 vt %, and further preferably 12~18 vt %. Thus the output and product purity of the magnesium sulfate product can be improved.

The cement of the present invention is cement containing magnesium sulfate, including magnesium sulfate cement, magnesium oxysulfate cement or magnesia cement. The magnesia cement is meant to include magnesium oxychloride cement, Sorel cement, and the mixture thereof. The cement of the present invention is preferably magnesium sulfate cement.

<Apparatus for Producing Cement Through Flue Gas Desulfurization>

The apparatus for producing cement through flue gas desulfurization of the present invention includes following equipment: a flue gas desulfurization equipment, a concentration equipment, a crystallization equipment, a centrifugation equipment, a drying equipment, a waste ash supplying equipment, a slag material supplying equipment, a magnesium oxide supplying equipment and a mixing equipment. Preferably, the apparatus for producing cement through flue gas desulfurization of the present invention can further include a discharging equipment. Preferably, the apparatus for producing cement through flue gas desulfurization of the present invention can further include a packaging equipment.

The flue gas desulfurization equipment of the present invention is configured to remove sulfur dioxide from the flue gas in a magnesium oxide based manner, and form an absorption product containing magnesium sulfate. The flue gas desulfurization equipment of the present invention can be a flue gas desulfurizer or a flue gas desulfurization tower. In view of industrial application, the flue gas desulfurization tower is preferably selected.

In an embodiment of the present invention, the upper portion of the interior of the flue gas desulfurization equipment is provided with a sulfur dioxide absorbing and spraying region, in which the sulfur dioxide in the flue gas is removed in a magnesium oxide based manner, and an absorption product containing magnesium sulfate is formed. The flue gas enter the interior of the flue gas desulfurization equipment from the lower portion of the equipment, and goes through the sulfur dioxide absorbing and spraying region during ascending and the sulfur dioxide in the flue gas is absorbed, and the purified flue gas is discharged from the top of the flue gas desulfurization equipment. Agents used in the sulfur dioxide absorbing and spraying region can be the frequently adopted desulfurization agent slurry used for the magnesium oxide based flue gas desulfurization in the art. Preferably, the desulfurization agent of the present invention can be those desulfurization agents disclosed in Chinese patent application with publication No. CN102745726A, CN102745725A and CN102836636A. For example, the desulfurization agents disclosed in Embodiment 1 or 2 of CN102745726 A. The contents of all the above patent applications are incorporated herein by reference in their entireties. These desulfurization agent slurries can be acquired by evenly dispersing the desulfurization agents in water.

The concentration equipment of the present invention is configured to concentrate the absorption product containing magnesium sulfate from the flue gas desulfurization equipment to form a concentration product. According to an embodiment of the present application, the concentration equipment is a cycling and precipitating tank provided inside the flue gas desulfurization equipment, and the cycling and precipitating tank is arranged at the lower portion of the flue gas desulfurization equipment. The cycling and precipitating tank can be configured to be singer layer precipitating or double-layer precipitating or multiple-layer precipitating. The material of the cycling and precipitating tank can be glass fiber reinforced plastics, special steel, or ordinary steel material after anti-corrosion treatment.

According to another embodiment of the present application, the concentration equipment can be a one-effect, two-effect or three-effect evaporation and crystallization equipment. The material of the evaporation and concentration equipment is mainly a titanium material. Preferably, the concentration equipment of the present invention is a three-effect evaporation and concentration equipment arranged outside the flue gas desulfurization equipment.

In the present application, the concentration equipment is preferably configured to evaporate water in the absorption product containing magnesium sulfate (sometimes called magnesium sulfate solution) to form a saturated magnesium sulfate solution. The concentration equipment of the present invention is preferably a three-effect evaporation and concentration equipment (e.g. three-effect evaporator): a secondary steam produced by a first effect enter a second effect as a heat source, a secondary steam produced by evaporation of the second effect is used as a heat source of a third effect, so as to save the live steam. The second effect and the third effect of the equipment adopt a manner of forced cycle and concentration, such that the heat transfer efficiency is improved, the cycle is intensive, the evaporation rate is fast, the heating time is short, and the scaling will not readily occur. The temperature of the feed magnesium sulfate solution of the three-effect evaporation and concentration is $30~40°$ C. and the density is $1.1~1.26$ t/m$^3$; the temperature of the magnesium sulfate solution after evaporation is $60~70°$ C. and the density is $1.32~1.46$ t/m$^3$.

The crystallization equipment of the present invention is configured to receive the concentration product formed from the concentration equipment, and generate crystal particles in the concentration product, so as to acquire a concentration product containing magnesium sulfate crystals. Preferably, the crystallization equipment of the present invention is configured for cooling crystallization of the concentration product, so as to precipitate magnesium sulfate from the solution. The crystallization equipment is preferably a continuous cooling crystallizer, further preferably DTB continuous cooling crystallizer, most preferably three-stage recrystallization flash tank, where the magnesium sulfate waste solution goes from a first effect concentration, through a second effect concentration and to a third effect concentration with a concentration degree reaching 38%, which is already a saturated solution; and then the crystal solution is pumped out by a discharging pump and delivered to a three-stage recrystallization flash tank to precipitate for crystallization. The DTB crystallizer is consisted of a crystallization tank, a condenser, a forced cycling pump, a discharging pump and a vacuum pump, etc. DTB (Drabt Tube Babbled) crystallizer is a crystallizer with a draft tube and a baffle plate, and is a circulating crystallizer for a fine crystal slurry. With a draft tube and a tube-shaped baffle plate arranged in the crystallizer and a propelled stirring system configured therein, a hot saturated feed liquid is added into the lower portion of a cycling pipe, and is delivered to a heater after mixing with the mother liquid entrained with small crystals in the cycling pipe. The heated solution flows into the crystallizer from a position near the bottom of the draft tube, and is delivered to the liquid surface along the draft tube by a slowly rotating propeller. The solution is cooled and evaporated at the surface of the solution and reaches an over-saturated state, in which part of the solute is precipitated on the surface of suspended particles, so as to make the crystal grow. A precipitation area is provided on the periphery of the annular baffle plate. Big particles are precipitated in the precipitation area, while small particles enter the cycling pipe with the mother liquid and are heated to dissolve. The crystals sink into the elutriation column from the bottom of the crystallizer. In order to make the granularity of the crystalline product as uniform as possible, part of the mother liquid from the precipitation area is added to the bottom of the elutriation column, so that small particles flow back to the crystallizer with the solution due to the effect of hydraulic classification, and the crystalline product is discharged from the lower portion of the elutriation column. The temperature for the cooling crystallization is generally controlled at $25~35°$ C., and preferably $25~30°$ C.

According to the apparatus of the present invention, the crystallization equipment can also be a crystallization tank which can adopt natural cooling or can be an automatic cooling system with a water cooling ring device. The cold source can be natural wind, normal temperature water or chilled water. An independent cooling device such as cooling tower can be provided.

The centrifugation equipment of the present invention is configured to centrifugally separate the concentration product containing magnesium sulfate crystals from the crystallization equipment to form a precipitate containing the magnesium sulfate crystals. The centrifugation equipment includes those well-known in the art, which will not be repeated herein.

The drying equipment of the present invention is configured to dry the precipitate containing the magnesium sulfate crystals from the centrifugation equipment to form a dried precipitate. The drying equipment of the present invention is preferably a vibrated fluidized bed drying equipment, which is especially suitable for the drying process of the magnesium sulfate crystals. The present invention preferably adopts a vibrated fluidized bed drying equipment configured with a hot air device. The ventilator inputs filtered air into an air heater, the heated air enters the lower box body of the host, and then goes through the air distribution plate of the fluidized bed and is vertically blew from down to up into the dried supplies, so as to make the supplies to be in a boiling state. The supplies get in from an feed inlet, the host generates symmetrical vibration under an exciting force of a vibrating motor, such that the supplies are horizontally threw, so as to form a fluidization state due to the comprehensive effect of the heated air flow and the vibration of the machine, which therefore achieves a long contact time of the supplies with the hot air and a large area, thereby obtaining highly efficient drying effect. The apparatus of the present invention can adopt saturated steam with a low calorific value at a temperature of 120~133° C. and a pressure of 0.2~0.3 MPa to heat and deliver the air into the vibrated fluidized bed, and to realize fully drying of the magnesium sulfate crystals to form magnesium sulfate supplies. The steam output from the fluidized bed can be used for the evaporation and concentration equipment, which not only saves energy but also reduces the operating cost.

The magnesium oxide supplying equipment of the present equipment is configured to provide magnesium oxide used for the magnesium oxysulfate cement.

The waste ash supplying equipment of the present invention is configured to provide waste ash. The supplying equipment includes those well-known in the art, which will not be repeated herein.

The slag material supplying equipment of the present invention is configured to provide slag material. Since the granularity of the slag materials from different sources is large and heterogeneous, which needs to be powdered and uniformed, therefore, the flue gas desulfurization apparatus of the present invention can also include a slag material grinding equipment, configured to grind the slag material used for the cement into a powder, and to be transported to the slag material supplying equipment. The slag material grinding equipment mainly refers to a ball grinder in the field of the cement production. The ball grinder can grind waste slags such as mineral waste slag, steel slag, pulverized fuel ash, industrial waste and so on, the ground product can reach a specific surface area of 400 $m^2$/kg~600 $m^2$/kg.

The additive supplying equipment of the present invention is configured to provide an additive used for cement. The supplying equipment includes those well-known in the art, which will not be repeated herein.

The waste ash supplying equipment, the slag material supplying equipment, the additive supplying equipment are preferably arranged in parallel, so as to respectively provide raw material for the mixing equipment.

The mixing equipment of the present invention is configured to mix the dried precipitate from the drying equipment, the waste ash from the waste ash supplying equipment, the slag material used for cement from the slag material supplying equipment and the additive used for cement from the additive supplying equipment, so as to form cement. The mixing equipment of the present invention can be a single-shaft mixer, a double-shaft mixer or a blender. Preferably, the mixing equipment of the present invention is a blender.

The apparatus for producing cement through flue gas desulfurization can also include a discharging equipment, configured to discharge the absorption product containing magnesium sulfate from the flue gas desulfurization equipment and transport the same to the concentration equipment. According to a specific embodiment of the present invention, the discharging equipment is a discharging pump.

The apparatus for producing cement through flue gas desulfurization can also include a packaging equipment, e.g. those packaging equipment well known in the art, which will not be repeated herein.

<Method for Producing Cement>

The apparatus for producing cement through flue gas desulfurization can be used to produce cement. The method for producing cement of the present invention can include following steps: 1) a flue gas desulfurization step, 2) a concentration step, 3) a crystallization step, 4) a centrifugation step, 5) a drying step, 6) a mixing step. The method for producing cement of the present invention can also include a discharging step. Preferably, the method for producing cement of the present invention can also include a packaging step.

The fuel gas desulfurization step includes: removing sulfur dioxide from a flue gas in a magnesium oxide based manner in a flue gas desulfurization equipment, and forming an absorption product containing magnesium sulfate. According to an embodiment of the present invention, the upper portion of the interior of the flue gas desulfurization equipment is provided with a sulfur dioxide absorbing and spraying region. The flue gas enter the interior of the flue gas desulfurization equipment from the lower portion of the equipment, and goes through the sulfur dioxide absorbing and spraying region during ascending and the sulfur dioxide in the flue gas is herein absorbed, and the purified flue gas is then discharged from the top of the flue gas desulfurization equipment. The agent used for the sulfur dioxide absorbing and spraying region is described above, which will not be repeated herein.

The concentration step of the present invention includes: concentrating the absorption product containing magnesium sulfate from the flue gas desulfurization equipment in a concentration equipment, so as to form a concentration product. According to an embodiment of the present application, the absorption product containing magnesium sulfate from the flue gas desulfurization equipment is concentrated in a cycling and precipitating tank provided inside the flue gas desulfurization equipment (the cycling and precipitating tank is arranged at the lower portion of the flue gas desulfurization equipment), such that the absorption product containing magnesium sulfate is introduced into the cycling and precipitating tank by gravity.

According to another embodiment of the present application, the absorption product containing magnesium sulfate from the flue gas desulfurization equipment is concentrated in a three-effect evaporation and concentration equipment provided outside the flue gas desulfurization equipment. For example, a discharging equipment can be used to introduce the above-mentioned absorption product into the three-effect evaporation and concentration equipment to be concentrated.

The crystallization step includes: receiving, by a crystallization equipment, the concentration product formed from the concentration equipment, and generating crystal particles in the concentration product, so as to acquire a concentration product containing magnesium sulfate crystals. The concentration product of the present invention is mainly a saturated magnesium sulfate solution, from which a magnesium sulfate crystal slurry is obtained by cooling. The temperature for the cooling crystallization is controlled at 25~35° C., preferably 28~30° C. The granularity of the magnesium sulfate crystal particles obtained from the crystallization step of the present invention is larger than 0.2 mm, preferably larger than 0.3 mm. The granularity of the present invention is measured by a sieving manner (see GB/T21524-2008).

The centrifugation step of the present invention includes: centrifugally separating the concentration product containing the magnesium sulfate crystals from the crystallization equipment in a centrifugation equipment, so as to form a precipitate containing the magnesium sulfate crystals. In order to guarantee sufficient centrifugation, the speed of centrifugation is controlled at 1500~2000 rpm, preferably 1600~1800 rpm. For a batch operation, the centrifugation time for each batch of supplies is controlled at 5~30 minutes, preferably at 5~10 minutes. For a continuous operation, the centrifugation time for each batch of supplies is controlled at 10~30 minutes, preferably at 10~15 minutes.

The drying step of the present invention includes: drying the precipitate containing the magnesium sulfate crystals from the centrifugation equipment in a drying equipment, so as to form a dried precipitate. The drying step of the present invention can be operated in a way of vacuum drying or introducing heated air. The drying temperature is 90~150° C., preferably 100~130° C., further preferably 110~120° C.; the drying pressure is 0.01~0.5 MPa, preferably 0.05~0.2 MPa. Through the drying step, the water content of the dried precipitate is less than 1 wt %, preferably less than 0.5 wt %, further preferably less than 0.1 wt %.

The mixing step of the present invention includes mixing the dried precipitate from the drying equipment, the magnesium oxide from the magnesium oxide supplying equipment, the waste ash from the waste ash supplying equipment, the slag material from the slag material supplying equipment and the additive from the additive supplying equipment in a mixing equipment, so as to form cement. The slag material of the present invention is one or more selected from a group consisting of furnace slag, mineral waste residue, steel slag and iron slag. Preferably, the slag material of the present invention is selected from furnace slag and/or mineral waste residue. The additive of the present invention is one or more selected from a group consisting of silicone rubber, polyester fiber, glass fiber, phosphate acid, dihydrogen phosphate salt, hydrogen phosphate salt, tartaric acid, tartrate, magnesium oxide and Nitrilotri(methylphosphonic acid), and preferably form a group consisting of phosphate acid, dihydrogen phosphate salt, hydrogen phosphate salt, tartaric acid, tartrate and Nitrilotri(methylphosphonic acid). The waste ash of the present invention can be one or more selected from a group consisting of pulverized fuel ash, gypsum powder, dolomite powder and shale powder, and preferably from pulverized fuel ash.

During production, varieties of slags like furnace slag, mineral waste residue, steel slag and iron slag produced in power plant, steel plant and chemical plant can be collected, and then ground into powders of desired specifications by a slag material grinding equipment to be delivered to a warehouse for reserve; the ash (e.g. pulverized fuel ash) discharged from the lower portion of the dust collector behind the coal fired boiler, sintering machine, shaft furnace or pellet of the power plant or steel plant can all be collected to a waste ash warehouse for reserve.

Unless otherwise noted, the raw materials, process conditions used in the following embodiments and examples are as follows:

1. The Operating Conditions of the Flue Gas Desulfurization are Shown in the Following Tables.

Operating Condition Parameters of a Flue Gas Desulfurization Project of a Sintering Machine in a Steel Plant

| No. | Project | Number | Unit |
| --- | --- | --- | --- |
| 1 | Inlet flue gas volume of the desulfurization tower (operating condition) | 1590000 | m$^3$/h |
| 2 | Flue gas volume in a standard state | 1104504 | Nm$^3$/h |
| 3 | Inlet temperature of the desulfurization tower | 120 | ° C. |
| 4 | Inlet concentration of sulfur dioxide | 2000 | mg/Nm$^3$ |
| 5 | Desulfurization efficiency | 98 | % mass percentage |
| 6 | Ratio of magnesium to sulfur | 1.02 | |
| 7 | Purity of magnesium oxide | 85 | % mass percentage |
| 8 | Moisture content of the flue gas | 9 | % mass percentage |

Discharging Condition of the Desulfurization Project

| No. | Project | Number | Unit |
| --- | --- | --- | --- |
| 1 | Outlet flue gas volume of the desulfurization tower (operating condition) | 1374117 | m$^3$/h |
| 2 | Flus gas discharge temperature | 50 | ° C. |
| 3 | Discharge concentration of sulfur dioxide | <50 | mg/Nm$^3$ |
| 4 | Output of magnesium sulfate | 4.3 | t/h |
| 5 | Quality of magnesium sulfate | >98 | % mass percentage |

2. Other Specifications

The composition and ratio of the desulfurization agent are as follows: magnesium oxide powder.

The ratio of the desulfurization agent slurry is as follows: the weight ratio of the desulfurization agent to water is 1:3.

The temperature of the cycling and precipitating tank is 60° C., the residence time of the supplies is 30 minutes;

With respect to the temperature of the three-effect evaporator, the temperature of the first effect, the second effect and the third effect is respectively 120° C., 90° C. and 60° C.; the residence time of the supplies is respectively 30 minutes, 20 minutes and 20 minutes.

The cooling temperature of the crystallizer is 30° C., the crystallization time is 10 minutes;

The rotation speed of the centrifuge is 2000 rpm, the centrifugation time is 5 minutes;

The drying temperature is 120° C., the drying time is 30 minutes.

In the complex additive, the weight ratio of sodium dihydrogen phosphate to magnesium oxide is 0.5:9.5.

The present invention is further described in detail by combining the following accompanying drawings.

Embodiment 1

FIG. 1 is a diagram of an apparatus of Embodiment 1. Industrial tap water is added into the desulfurization agent magnesium oxide powder to form desulfurization agent slurry-magnesium hydroxide slurry which then is pumped to a desulfurization tower 1, configured to absorb sulfur dioxide in the flue gas in the sulfur dioxide absorbing and spraying region.

The flue gas from a coal fired boiler (the content of sulfur dioxide is 2000 mg/Nm$^3$, the content of oxygen is 18 vt %) enter the desulfurization tower 1 from the lower portion of the desulfurization tower 1. The flue gas contacts with the sulfur dioxide absorbing and spraying region 2 during ascending, and is discharged from the top of the desulfurization tower 1. The sulfur dioxide absorbing and spraying region 2 sprays the desulfurization agent slurry so as to absorb sulfur dioxide in the flue gas.

The absorption product (the temperature is 30° C., the density is 1.2 t/m$^3$) formed after the desulfurization agent slurry absorbs the sulfur dioxide is introduced into a cycling and precipitating tank 41 located at the lower portion of the interior of the desulfurization tower 1 by gravity, a concentration product (a saturated magnesium sulfate solution, the temperature is 70° C., the density is 1.4 t/m$^3$) is obtained by concentration.

The above-mentioned concentration product enter a crystallizer 6, generates crystal particles with a granularity of larger than 0.2 mm in the crystallizer, and then most of water therein is removed by a centrifuge 7, and then is delivered to a dryer 8 for drying. The dryer 8 is a vibrated fluidized bed. Air at 120° C., 0.2 MPa is introduced into the vibrated fluidized bed and a fully drying of the magnesium sulfate crystals is realized under the effect of the mechanical vibration, and the magnesium sulfate supplies are introduced into a blender 9 when the water content is less than 1 wt %.

The furnace slag collected from a steel plant is ground by a grinder 10 into a powdered material with a specific surface area of approximately 500 m$^2$/kg, which then is delivered into a slag material suppler 11; the pulverized flue ash from the coal fired boiler of the steel plant is added into a pulverized flue ash suppler 12; the complex additive is added into an additive supplier 13. The above-mentioned slag material, pulverized flue ash, magnesium oxide and complex additive are then delivered into the bender 9 by a pneumatic conveying equipment.

In the bender 9, the above-mentioned slag material, pulverized flue ash, magnesium oxide, complex additive and the magnesium sulfate product produced in the above-mentioned flue gas desulfurization process are evenly mixed by stirring, and the stirring time is 30 minutes, so as to obtain magnesium sulfate cement. Finished magnesium sulfate cement is delivered to a warehouse after being packaged by a packaging machine 15.

Embodiment 2

Figure 2:
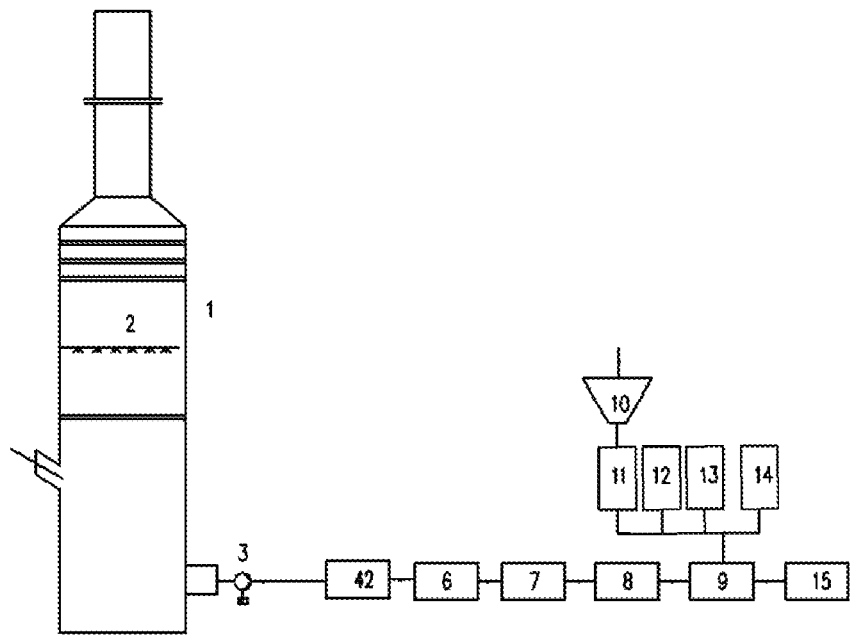
FIG. 2 is a diagram of an apparatus of Embodiment 2 of the present invention.

FIG. 2 is a diagram of an apparatus of Embodiment 2. Industrial tap water is added into the desulfurization agent magnesium oxide powder to form a desulfurization agent slurry-magnesium hydroxide slurry, which then is delivered to a desulfurization tower 1, configured to absorb sulfur dioxide in the flue gas in the sulfur dioxide absorbing and spraying region.

The flue gas from a coal fired boiler (the content of sulfur dioxide is 2000 mg/Nm$^3$, the content of oxygen is 18 vt %) enter the desulfurization tower 1 from the lower portion of the desulfurization tower 1. The flue gas contacts with the sulfur dioxide absorbing and spraying region 2 during ascending, and is discharged from the top of the desulfurization tower 1. The sulfur dioxide absorbing and spraying region 2 sprays the desulfurization agent slurry so as to absorb sulfur dioxide in the flue gas.

The absorption product (the temperature is 30° C., the density is 1.2 t/m$^3$) formed after the desulfurization agent slurry absorbs the sulfur dioxide is discharged by a discharging pump 3 and introduced into a three-effect evaporator 42 outside the desulfurization tower 1, and a concentration product (a saturated magnesium sulfate solution, the temperature is 70° C., the density is 1.4 t/m$^3$) is obtained by concentration.

The above-mentioned concentration product enter a crystallizer 6, generates crystal particles with a granularity of larger than 0.2 mm in the crystallizer, and then most of water therein is removed by a centrifuge 7, and then is delivered to a dryer 8 for drying. The dryer 8 is a vibrated fluidized bed. Air at 120° C., 0.2 MPa is introduced into the vibrated fluidized bed and a fully drying of the magnesium sulfate crystals is realized under the effect of the mechanical vibration, and the magnesium sulfate supplies are introduced into a blender 9 when the water content is less than 1 wt %.

The furnace slag collected from a steel plant is ground by a grinder 10 into a powdered material with a specific surface area of approximately 400 m$^2$/kg which then is delivered into a slag material suppler 11; the pulverized flue ash from the coal fired boiler of the steel plant is added into a pulverized flue ash suppler 12; the complex additive is added into an additive supplier 13. The above-mentioned slag material, pulverized flue ash, magnesium oxide and complex additive are then delivered into the bender 9 by a pneumatic conveying equipment.

In the bender 9, the above-mentioned slag material, pulverized flue ash, magnesium oxide, complex additive and the magnesium sulfate product produced in the above-mentioned flue gas desulfurization process are evenly mixed by stirring, and the stirring rate is 1600 rpm, the stirring time is 30 minutes, so as to obtain magnesium sulfate cement. Finished magnesium sulfate cement is delivered to a warehouse after being packaged by a packaging machine 15.

APPLICATION EXAMPLE 1

The apparatus and process of Embodiment 1 are adopted to produce cement, the formula of the mixing step is as follows:

| Specification | Magnesium sulfate supplies | Magnesium oxide | Pulverized flue ash | Complex additive |
|---|---|---|---|---|
| kg | 30 | 30 | 35 | 5 |

100 kg of the above-mentioned magnesium sulfate cement and 30 kg of water are mixed to obtain a cement slurry, the cement slurry is poured into a 40×40×160 mm mould for casting, and then the casted cement is tested according to the GB177-1999 standard, the testing results are shown in the following table.

| Number of days (d) | Compressive strength (MPa) | Rupture strength (MPa) |
|---|---|---|
| 3 | 22 | 3.9 |
| 7 | 56 | 8.5 |
| 28 | 76 | 14.6 |

APPLICATION EXAMPLE 2

The apparatus and process of Embodiment 2 are adopted to produce cement, the formula of the mixing step is as follows:

| Specification | Magnesium sulfate supplies | Pulverized flue ash | Magnesium oxide | Complex additive |
|---|---|---|---|---|
| kg | 30 | 25 | 30 | 15 |

100 kg of the above-mentioned magnesium sulfate cement and 30 kg of water are mixed to obtain a cement slurry, the cement slurry is poured into a 40×40×160 mm mould for casting, and then the casted cement is tested according to the GB177-1999 standard, the testing results are shown in the following table.

| Number of days (d) | Compressive strength (MPa) | Rupture strength (MPa) |
|---|---|---|
| 3 | 26 | 4.1 |
| 7 | 59 | 8.8 |
| 28 | 81 | 15.0 |

APPLICATION EXAMPLE 3

The apparatus and process of Embodiment 2 are adopted to produce cement, the formula of the mixing step is as follows:

| Specification | Magnesium sulfate supplies | Pulverized flue ash | Magnesium oxide | Complex additive |
|---|---|---|---|---|
| kg | 35 | 35 | 25 | 5 |

100 kg of the above-mentioned magnesium sulfate cement and 30 kg of water are mixed to obtain a cement slurry, the cement slurry is poured into a 40×40×160 mm mould for casting, and then the casted cement is tested according to the GB177-1999 standard, the testing results are shown in the following table.

| Number of days (d) | Strength (MPa) | Bending strength (MPa) |
|---|---|---|
| 3 | 21 | 2.9 |
| 7 | 52 | 7.6 |
| 21 | 72 | 12.8 |

APPLICATION EXAMPLE 4

The apparatus and process of Embodiment 2 are adopted to produce cement, the formula of the mixing step is as follows:

| Specification | Magnesium sulfate supplies | Slag material | Magnesium oxide | Complex additive |
|---|---|---|---|---|
| kg | 45 | 25 | 25 | 5 |

100 kg of the above-mentioned magnesium sulfate cement and 30 kg of water are mixed to obtain a cement slurry, the cement slurry is poured into a 40×40×160 mm mould for casting, and then the casted cement is tested according to GB177-1999 standard, the testing results are shown in the following table.

| Number of days (d) | Strength (MPa) | Bending strength (MPa) |
|---|---|---|
| 3 | 19 | 2.2 |
| 7 | 48 | 6.6 |
| 28 | 66 | 10.8 |

APPLICATION EXAMPLE 5

The apparatus and process of Embodiment 2 are adopted to produce cement, the formula of the mixing step is as follows:

| Specification | Magnesium sulfate supplies | Magnesium oxide | Pulverized flue ash | Complex additive |
|---|---|---|---|---|
| kg | 25 | 25 | 45 | 5 |

100 kg of the above-mentioned magnesium sulfate cement and 30 kg of water are mixed to obtain a cement slurry, the cement slurry is poured into a 40×40×160 mm mould for casting, and then the casted cement is tested according to GB177-1999 standard, the testing results are shown in the following table.

| Number of days (d) | Strength (MPa) | Bending strength (MPa) |
|---|---|---|
| 3 | 21 | 3.2 |
| 7 | 54 | 7.9 |
| 28 | 72 | 12.8 |

It can be seen from the above data that, the performances of the cement are better when the content of magnesium sulfate in the cement is between 25~45 wt %; the strength and bending strength of the cement is reduced when the content of magnesium sulfate exceeds 45%. Besides, in order to maintain the performances of the cement, the content of the complex additive in the cement is preferably maintained between 5~15 wt %.

The present invention is not limited to the above-mentioned embodiments, any variation, modification or replacement that can be conceived by the person skilled in the art without departing from the substantial content of the present invention shall fall into the scope of the present invention.

What is claimed is:

1. A method for producing cement with an apparatus for producing cement through flue gas desulfurization, wherein the apparatus comprises:
   a flue gas desulfurization equipment, configured to remove sulfur dioxide from a flue gas in a magnesium oxide based manner, and form an absorption product containing magnesium sulfate;
   a concentration equipment, configured to concentrate the absorption product containing magnesium sulfate from the flue gas desulfurization equipment to form a concentration product;
   a crystallization equipment, configured to receive the concentration product formed in the concentration equipment, and generate crystal particles in the concentration product, so as to acquire a concentration product containing magnesium sulfate crystals;

a centrifugation equipment, configured to centrifugally separate the concentration product containing the magnesium sulfate crystals from the crystallization equipment to form a precipitate containing the magnesium sulfate crystals;

a drying equipment, configured to dry the precipitate containing the magnesium sulfate crystals from the centrifugation equipment to form a dried precipitate;

a waste ash supplying equipment, configured to provide waste ash;

a slag material supplying equipment, configured to provide a slag material used for cement;

an additive supplying equipment, configured to provide an additive used for cement; and a mixing equipment, configured to mix the dried precipitate from the drying equipment, the waste ash from the waste ash supplying equipment, the slag material used for cement from the slag material supplying equipment and the additive used for cement from the additive supplying equipment to form cement, the method comprising steps of:

1) a flue gas desulfurization step: removing sulfur dioxide from a flue gas in a magnesium oxide based manner in a flue gas desulfurization equipment, and forming an absorption product containing magnesium sulfate, wherein a content of sulfur dioxide in the flue gas is 1000 mg/Nm$^3$~5000 mg/Nm$^3$, and a content of oxygen in the flue gas is 9~18 vt %;

2) a concentration step: concentrating the absorption product containing magnesium sulfate from the flue gas desulfurization equipment in a concentration equipment, so as to form a concentration product, wherein the concentration equipment is a three-effect evaporator, a magnesium sulfate solution fed in the three-effect evaporator has a temperature of 30~40° C. and a density of 1.1~1.26 t/m$^3$; the magnesium sulfate solution, after being evaporated, has a temperature of 60~70° C. and a density of 1.32~1.46 t/m$^3$;

3) a crystallization step: receiving, by a crystallization equipment, the concentration product formed in the concentration equipment, and generating crystal particles in the concentration product, so as to acquire a concentration product containing magnesium sulfate crystals, wherein the crystal particles have a granularity larger than 0.2 mm, and a temperature of the crystallization is controlled at 25~35° C.;

4) a centrifugation step: separating centrifugally the concentration product containing the magnesium sulfate crystals from the crystallization equipment in a centrifugation equipment, so as to form a precipitate containing the magnesium sulfate crystals, wherein a speed of centrifugation is controlled at 1500~2000 rpm;

5) a drying step: drying the precipitate containing the magnesium sulfate crystals from the centrifugation equipment in a drying equipment, so as to form a dried precipitate, wherein the drying step is performed at a drying temperature of 90~150° C. under a drying pressure of 0.01~0.5 MPa, and through the drying step, the dried precipitate has a water content less than 1 wt %;

6) a mixing step: mixing the dried precipitate from the drying equipment, waste ash from a waste ash supplying equipment, slag material from a slag material supplying equipment and an additive from an additive supplying equipment in a mixing equipment, so as to form cement, wherein a content of magnesium sulfate in the cement is between 30 wt % to 45 wt %, the additive of the mixing step is one or more selected from the group consisting of silicone rubber, tartaric acid, tartrate, and Nitrilotri(methylphosphonic acid).

2. The method according to claim 1, wherein, the granularity of the crystal particles in the crystallization step is larger than 0.3 mm.

3. The method according to claim 1, wherein, the water content of the dried precipitate in the drying step is less than 0.5 wt %.

4. The method according to claim 1, wherein,
the slag material of step 6) is one or more selected from a group consisting of furnace slag, mineral waste residue, steel slag, iron slag and pulverized fuel ash.

* * * * *